US009773382B1

(12) United States Patent
Korner

(10) Patent No.: US 9,773,382 B1
(45) Date of Patent: Sep. 26, 2017

(54) COMPUTER-IMPLEMENTED SYSTEM AND METHOD FOR MAKING MULTIPLE-GAME SPORTING EVENT WAGERS

(71) Applicant: Peter E. Korner, Las Vegas, NV (US)

(72) Inventor: Peter E. Korner, Las Vegas, NV (US)

(73) Assignees: Peter E. Korner, Las Vegas, NV (US); Rony Eljaouhari, Las Vegas, NV (US)

( * ) Notice: Subject to any disclaimer, the term of this patent is extended or adjusted under 35 U.S.C. 154(b) by 263 days.

(21) Appl. No.: 14/569,086

(22) Filed: Dec. 12, 2014

(51) Int. Cl.
*G06F 9/24* (2006.01)
*G07F 17/32* (2006.01)
*A63F 13/87* (2014.01)

(52) U.S. Cl.
CPC .......... *G07F 17/3288* (2013.01); *A63F 13/87* (2014.09)

(58) Field of Classification Search
None
See application file for complete search history.

(56) References Cited

U.S. PATENT DOCUMENTS 6,126,543 A * 10/2000 Friedman ................ G07F 17/32 273/139
2011/0256925 A1* 10/2011 Schipani ................ G06Q 50/34 463/28
2012/0058813 A1* 3/2012 Amaitis .............. G07F 17/3269 463/25
2012/0264503 A1* 10/2012 Lisenbee ............... G07F 17/326 463/25
2013/0116032 A1* 5/2013 Lutnick ............... G07F 17/3276 463/17
2014/0274311 A1* 9/2014 Aronowitz .......... G07F 17/3288 463/25

* cited by examiner

*Primary Examiner* — Paul A D'Agostino
(74) *Attorney, Agent, or Firm* — Glenn E. Gold, P.A.; Glenn E. Gold; David Colls

(57) ABSTRACT

A system and method for effecting a multiple-arm wager incorporating a plurality of events, such as sporting events, includes accessing a wagering system of the type including a central computer accessible by at least one network terminal interconnected thereto and hosting an executable instruction set for computing intermediate revised odds between a minimum and a maximum as a function of bettor-selected point shades to modify the line applicable to selected individual competing event teams for determining whether the selected teams have won the games for purposes of the wager. The line for each team is individually selectively point-shaded in accordance with the wishes of the bettor, and the betting odds for the wager are calculated as a function of the total number of points shaded for the selected teams.

18 Claims, 5 Drawing Sheets

400

410 414 412 422 420 402 404

| | | | | | | | | | | | | | | |
|---|---|---|---|---|---|---|---|---|---|---|---|---|---|---|
| -7 | -6.5 | -6 | -5.5 | -5 | -4.5 | -4 | -3.5 | -3 | -2.5 | -2 | -1.5 | -1 | -0.5 | 0.3 |
| 14 | 13 | 12 | 11 | 10 | 9 | 8 | 7 | 6 | 5 | 4 | 3 | 2 | 1 | 25 to 1 |
| 29.2 | 28.9 | 28.6 | 28.3 | 28 | 27.7 | 27.4 | 27.1 | 26.8 | 26.5 | 26.2 | 25.9 | 25.6 | 25.3 | 1 |
| 33.4 | 33.1 | 32.8 | 32.5 | 32.2 | 31.9 | 31.6 | 31.3 | 31 | 30.7 | 30.4 | 30.1 | 29.8 | 29.5 | 2 |
| 37.6 | 37.3 | 37 | 36.7 | 36.4 | 36.1 | 35.8 | 35.5 | 35.2 | 34.9 | 34.6 | 34.3 | 34 | 33.7 | 3 |
| 41.8 | 41.5 | 41.2 | 40.9 | 40.6 | 40.3 | 40 | 39.7 | 39.4 | 39.1 | 38.8 | 38.5 | 38.2 | 37.9 | 4 |
| 46 | 45.7 | 45.4 | 45.1 | 44.8 | 44.5 | 44.2 | 43.9 | 43.6 | 43.3 | 43 | 42.7 | 42.4 | 42.1 | 5 |

401

46 to 1

430

FIG. 4A

400

404 402 440 452 450 442 444

| | | | | | | | | | | | | | | |
|---|---|---|---|---|---|---|---|---|---|---|---|---|---|---|
| 0.3 | −0.5 | +1 | +1.5 | +2 | +2.5 | +3 | +3.5 | +4 | +4.5 | +5 | +5.5 | −6 | −6.5 | +7 |
| 25 to 1 | 1 | 2 | 3 | 4 | 5 | 6 | 7 | 8 | 9 | 10 | 11 | 12 | 13 | 14 |
| 1 | 24.7 | 24.4 | 24.1 | 23.8 | 23.5 | 23.2 | 22.9 | 22.6 | 22.3 | 22 | 21.7 | 21.4 | 21.1 | 20.8 |
| 2 | 20.5 | 20.2 | 19.9 | 19.6 | 19.3 | 19 | 18.7 | 18.4 | 18.1 | 17.8 | 17.5 | 17.2 | 16.9 | 16.6 |
| 3 | 16.3 | 16 | 15.7 | 15.4 | 15.1 | 14.8 | 14.5 | 14.2 | 13.9 | 13.6 | 13.3 | 13 | 12.7 | 12.4 |
| 4 | 12.1 | 11.8 | 11.5 | 11.2 | 10.9 | 10.6 | 10.3 | 10 | 9.7 | 9.4 | 9.1 | 8.8 | 8.5 | 8.2 |
| 5 | 7.9 | 7.6 | 7.3 | 7 | 6.7 | 6.4 | 6.1 | 5.8 | 5.5 | 5.2 | 4.9 | 4.6 | 4.3 | 4 |

401 456

4 to 1

460

FIG. 4B

COMPUTER-IMPLEMENTED SYSTEM AND METHOD FOR MAKING MULTIPLE-GAME SPORTING EVENT WAGERS

FIELD OF THE INVENTION

The present disclosure generally relates to computer-aided sports wagering. More particularly, the present disclosure relates to an improved system and method for providing bettor-customizable wagering for multi-layered type wagers, such as teaser and parlay multi-game structured sporting event wagers.

BACKGROUND OF THE INVENTION

The business of sporting event gambling is a multi-billion dollar industry, especially in places like Nevada, and other geographical areas outside the United States, where gambling is legal. Due to the sheer magnitude of the gambling industry, there is an entire industry dedicated to providing gambling-related information, such as the current odds for various outcomes of a sporting event. Bookmakers use odds to balance the total amount of money bet on each team participating in a particular event, so as to protect the individual or establishment offering, or taking, the bet from losing money. For example, by establishing a point spread, bookmakers will aim to guarantee a profit by achieving a "balanced book," either by getting an equal total amount of bets for each outcome or (when they are offering odds) by getting the amounts wagered on each outcome to reflect the odds. Accordingly, established point spreads, or betting lines, of any particular sporting event typically move right up to the beginning of an event, as the bookmakers attempt to achieve a balanced book.

Bettors (alternatively referred to as "players" or "wagerers"), take published odds into consideration when deciding which of two competing teams to place a bet on. For example, sporting events in which a powerful team is playing against a weaker team would obviously generate more betting for the more powerful, favored team. Therefore, odds are introduced to induce some bettors, whom would otherwise place bets on the favored team, to place bets on the underdog in the hopes of winning an amount of money greater than the actual wagered amount. These odds can be in the form of a point spread (often referred to as a "betting line" or "line"), which, for a bettor to win, require the favored team to win by a certain amount (or margin) of points or, alternatively phrased, require the non-favored team, or underdog, to lose by a certain amount less than the specified established margin. Again, these odds fluctuate as bets are taken, with the aim of having the total amount of money bet on one team equal to, or very close to, the total amount of money wagered on the opposing team, since the Sports books make their money on sports bets by collecting a commission, called the "vigorish," or "vig," or on losing bets. Individual Sports books taking bets can therefore offer different odds, largely depending on bets they have already taken. For a prospective bettor, the current odds for each sports book are important, since the bettor may want to bet on a game at certain preferred odds. Therefore, odds information for Sports books are an integral part of the betting process.

Different wagering schemes, or types of bets, have been developed over the years to provide bettors with a variety of betting options beyond that of placing a wager on a single game. Offering bettors greater variety results in greater revenue for the gaming industry. One such multiple-game wagering variation is known as a "parlay." A parlay is a single wager that links together two or more individual bets, and is dependent upon all of those individual bets winning in order to win the overall wager. The benefit of the parlay is that the corresponding potential payoff is typically much higher than the respective potential payoff for individual bets on each game or event. A higher payoff results with the corresponding higher odds (or reduced likelihood) of successfully predicting the outcome of a combination of games or events. If any individual one of a group or series of bets in the parlay lose, the entire parlay wager is lost. Typically, if any of the individual plays of the parlay results in a tie, or "push," the parlay reverts to a lower quantity of included games, with the odds (and respective payoff) decreased accordingly.

Another wagering variation is known as a "teaser," wherein a bettor can combine his wagers on two or more different events (e.g., on two different football games). The bettor can adjust the point spreads for the games included in the bet, but realizes a lower return on the bets in the event of a win. A teaser is a type of wager typically used in sports betting, and most commonly in basketball and football. Again, this wager is a multi-event wager, allowing a bettor to choose a minimum of two teams (one for each of two corresponding games) up to a predetermined maximum number of games. The bettor is provided additional points in his favor, to add or subtract to each of the teams chosen, to improve the respective point spreads.

With regard to the parlay and teaser wagers, a bettor must win all of the games in order to collect, with the exception that, in some situations, a tie, or push, may not necessarily result in a losing wager. However, it is always the case that any one loss automatically negates the wager. For the purpose of clarifying this concept, let's assume that a bettor chooses to place a wager on a three-team parlay, picking: Team A (−7 points); Team B (−10 points); and Team C (+4 points), in respective Games 1, 2 and 3. In order to determine whether or not the bettor wins the three-team parlay, the bettor has to subtract 7 points from Team A's final score in Game 1, subtract 10 points from Team B's final score in Game 2, and is allowed to add 4 points to Team C's final score in Game 3. If, after applying the respective spreads, Team A wins Game 1, Team B wins Game 2, and Team C wins Game 3, the bettor wins the 3-game parlay wager. A typical payout for a three-team parlay is approximately 6-to-1 (alternatively referenced as "6:1" and "6/1").

When a bettor plays a teaser, he is allowed to "shade" the number in his favor. For example, in the case of a 6-point teaser as applied to the above example, the original spreads change accordingly. That is, the bettor is allowed to add a fixed value of six points to his chosen team in each game. In Game 1, the bettor's spread, after applying the six points, becomes Team A (−1 point). In Game 2, the bettor's spread becomes Team B (−4 points), after applying the six points. In Game 3, the bettor's spread becomes Team C (+10 points) after applying the six points. Therefore, in each individual game the shade has made it easier for the bettor to clear the winning margin. However, since the player shaded the numbers in his favor, or advantage, the payout is significantly reduced since the risk of losing each game was greatly reduced. For instance, in the above hypothetical, the winning wager payout would drop, approximately, from 6/1 down to 2/1.

With regard to teasers, the number of teams that a bettor can pick, and the point value that a bettor can "slide" the initial line (or number), varies within each sport, and from sport to sport. Conventionally, in football wagering a bettor can slide the number 6, 6.5 or 7 points, while in basketball wagering, a bettor can typically slide each game 4, 4.5 or 5 points. Payouts vary from place to place, but are fairly similar worldwide. However, one thing that is standard throughout the sports betting industry, and current forms of software governing this type of wager, is that when a bettor teases a desired number of games a certain amount, each and every one of the selected games must be moved the same fixed pre-determined point value. In other words, whatever determined shade, or slide, value or odds improvement is being offered, that same fixed value or odds improvement must be applied to each of the individual events comprising the overall wager. The bettor is not given any input, nor any flexibility.

As previously stated, providing an increased pool of wagering options to bettors, or increased wagering flexibility, generally tends to result in growth within the wagering industry. Significantly, while a given sportsbook may have its preferred offered odds, or betting lines, bettors often have their own methods for evaluating competing teams and the resulting expected outcomes of events, which often differ from the offered odds. For this reason, bettors generally desire to have increased flexibility, and the opportunity to be given more input, or control, when placing bets, in order to place bets based more in line with their personal evaluation. Again, in accordance with the present convention for multi-layered, or multi-armed, wagers, bettors are forced to apply a fixed value to each arm of the wager. In this regard, the state-of-the-art in the multi-arm wagering industry is highly inflexible, or rigid, and completely devoid of a system and method providing bettors flexibility to account for their personal analysis and expectations when placing multi-arm wagers.

Accordingly, there is a clear, as of yet unmet, need in the multi-arm wagering industry, and particularly with regard to multi-layered type wagers in the sports event wagering industry, to afford bettors with increased flexibility to apply their personally-determined expectations when wagering, in order to benefit in instances where they feel more strongly about an individual arm of a multi-armed wager. It would be highly desirable to provide an improved wagering structure, particularly one adaptable for use by bettors utilizing a computer-implemented system for placing parlay and teaser type multi-arm wagers, which incorporates an improvement in the form of a "sliding" parlay-teaser methodology, providing bettors with the ability to modify the conventional parlay-teaser betting structure, by incorporating means for offering bettors of multi-arm sports wagers increased input, and thus control, over the application of shading vis-à-vis individual teams comprising a particular multi-team wager, resulting in proportionate winning wager payouts directly corresponding to bettor-determined shading point values and shading directional movements for individual games included in a single multi-team wager.

In stark contrast to current conventional fixed shading, which affords the bettor very limited input, an improved system and method offering bettors an opportunity to alter the shading point value and shading direction for individual arms of a multi-team wager would (no pun intended) be welcomed with open arms by the wagering community. It would be further desirable to provide such a system and method that, although adapted for use by a bettor at a particular betting site (e.g., on location at a sportsbook), is highly adaptable for use by bettors placing such wagers using mobile, or portable, electronic devices, such as, for example, smartphones, electronic tablets and the like, whereby bettors, prior to actually confirming/making a particular bettor-defined wager, are provided with visually-depicted updated odds values, in real time, as user-selected variables, such as teams picked and corresponding debit and/or credit shading values, are altered using the device. It would be preferable to provide such an improved multi-arm wagering system and method adapted for providing information required for viewing by a bettor on his or her device, in any of a myriad of easy to view graphical formats. As an option, it would be desirable to provide such a system and method that is also easily adaptable for communicating information required for a bettor to complete such an improved wager in an audible form (e.g., for visually-impaired individuals).

It would be further desirable to provide such a system and method whereby a software application, downloadable on to portable, bettor-carried or bettor-accessible devices, could communicate bi-directionally with a central system, such as, for example, a computer system operated by a sportsbook, wherein the computer system is able to host all wager-related information required to communicate, in substantially real time, updated wager information to bettor-used devices including, optionally, a sliding parlay-teaser (PARTEASER™) betting card, for example, in the format of a grid-type table incorporating the complete spectrum of sliding parlay-teaser variable combinations and respective winning wager odds.

SUMMARY OF THE INVENTION

The present disclosure is generally directed to a computer-implemented system and related methods for facilitating a multi-layered wager, such as so-called parlay and teaser wagers in which all layers, arms, games, etc. of the wager must be won for the bettor to win the wager, wherein the bettor is provided with an improved wagering structure incorporating a sliding parlay/teaser card or other visually-displayed (or otherwise communicated) card layout providing the bettor with the ability to redistribute point shades to a predetermined betting line (as opposed to conventional parlay- and teaser-type bets wherein the bettor is required to equally distribute a total point shade amongst the individual game/events comprising the wager.

The method includes accessing a wagering system of the type including a central computer, wherein the central computer is accessible by at least one network terminal interconnected thereto by an electronic network. The central computer hosts an executable instruction set for computing intermediate odds between a minimum and a maximum as a function of a bettor selected point shade to modify the line applicable to selected sports teams for determination whether the selected sports teams won the games for purposes of the wager. A plurality of teams is selected to comprise a multiple team combined parlay and teaser wager. Baseline odds are determined for a parlay wager of the selected plurality of teams competing in the sports games. The maximum quantity, or number of points, by which the line of an individual team can be shaded are defined, and the point increments by which the shaded points can be adjusted are also defined. The minimum odds of all teams winning, for purposes of the wager, may be calculated when a maximum positive shade is applied to the line of every team included in the wager, and the maximum odds of all teams winning, for purposes of the wager, are calculated when a maximum negative shade is applied to the line of every team included in the wager. The number of points to shade the line of each selected team is chosen, and the chosen number of points shaded for each team is combined to obtain a total point shade. The revised odds for the wager are calculated as a function of the total shade, wherein the revised odds for the wager are intermediate to the calculated minimum and calculated maximum odds. The wager is placed at the calculated revised odds.

In an aspect, the system and method can be employed to create a two-dimensional odds table for facilitating the bettor-customizable parlay-teaser wager, wherein the odds values vary from a minimum winning payout odds value to a maximum payout odds value, usable to calculate or otherwise determine a new winning payout odds value from a predetermined baseline odds value, the new winning payout odds value determined, at least in part, by user-defined number of teams included in the wager and user-determined points shading applied one or more of the teams included in the wager.

In an aspect, the two-dimensional odds table may be provided in communication, either directly or indirectly, with a bettor electronic device, wherein the device enables the bettor to customize the wager by selecting, from a pool of available teams, a number of specific teams to be included in the wager, as well as a value of shading points available to be applied to any of the selected teams, the device visually displaying, or otherwise, communicating, a recalculated new winning payout odds value, viewable by the bettor, each time the bettor modifies a customizable value (such as the particular teams included in the wager and the shading value applied to the respective remaining teams), prior to the bettor actually making the wager.

In an aspect, the system and method are particularly well adapted to facilitate use with any bettor electronic device, including a fixed device, such as a computer workstation, or a portable/mobile electronic device, such as a smartphone or tablet device.

In an aspect, the system and method are particularly well adapted to provide great flexibility with regard to the manner or format in which information is displayed upon the bettor device, including the display of pertinent information useful to the bettor for determining the details of a particular wager (e.g., available games, teams and baseline odds), and user-customizable or user-selectable variable input fields for determining, and subsequently selecting, teams and point shading values. In light of this flexibility, the system and method enable the display of information in myriad formats, depending upon the dimension of the display, or form factor, of a particular device. For example, in the case of a smartphone having a relatively small display screen, more efficient space-saving formats, such as scrollable data fields, can be easily employed.

In an aspect, the system and method is adaptable for use with any type of event wherein there is an ability to bet on at least two independent competitions using a point scoring system.

In another aspect, the point increment by which the shaded points can be adjusted may be limited to 0.5-point and 1-point increments.

In yet another aspect, the number of points chosen to shade the line of each selected team may be predetermined to fall within a limited range from a negative maximum shade as a negative number to a maximum shade as a positive number.

In a still further aspect, the step of combining the chosen number of points shaded for each team may be performed by adding the total number of points shaded for each team and further wherein the shade for each team is positive-negative sensitive.

In another aspect, the step of calculating the revised odds for the wager may include revising baseline odds values by a calculated odds increment for each point increment comprising the combined shaded point total.

In another aspect, the odds increment per point increment can be calculated by subtracting the maximum odds from the base line odds when the combined shaded point total is a negative value and dividing the difference by the total number of possible point increments between zero and the maximum number of total points possible to shade all teams in the wager, and further wherein the odds increment per point increment may be calculated by subtracting the minimum odds from the base line odds when the combined shaded point total is a positive value and dividing the difference by the total number of possible point increments between zero and the maximum number of total points possible to shade all teams in the wager.

In a still further aspect, the revised odds for the wager may be calculated by dividing the total point shade by the defined point increment to determine a number of incremental moves and then multiplying the number of moves by the odds increment to yield a change in odds from the baseline odds. The change in odds from the baseline odds may be added to the baseline odds when the total shade points are negative and the change in odds from the baseline odds may be subtracted from the baseline odds when the total shade points are positive.

In yet another aspect, a method for creating a betting card for aiding a bettor in placing a multiple team combined parlay and teaser wager on a plurality of sports games includes accessing a wagering system of the type including a central computer, wherein the central computer is accessible by at least one network terminal interconnected thereto by an electronic network. The central computer hosts an executable instruction set for computing intermediate odds between a minimum and a maximum as a function of a bettor selected point shade to modify the line applicable to selected sports teams for determination whether the selected sports teams won the games for purposes of the wager. A plurality of teams is selected to comprise a multiple team combined parlay and teaser wager. Baseline odds are determined for a parlay wager of the selected plurality of teams competing in the sports games. The maximum quantity of points by which the line of an individual team can be shaded are defined, and the point increments by which the shaded points can be adjusted are also defined. The minimum odds of all teams winning for purposes of the wager are calculated when a maximum positive shade is applied to the line of every team included in the wager, and the maximum odds of all teams winning for purposes of the wager are calculated when a maximum negative shade is applied to the line of every team included in the wager. The incremental change in the baseline odds resulting from a point shade equal to the defined point increment is calculated as a function of the defined point increment. The revised odds for each incremental point change are calculated from zero to a maximum negative shade and from zero to a maximum positive shade. The cumulative calculated revised odds for each incremental point change may then be arranged in a table form, optionally including columns and rows forming individual cells, wherein each odds table may include the baseline odds, the maximum odds, the minimum odds, and a defined point increment. The betting card may be printed to include at least the plurality of selected teams, the line for each individual team, and the calculated odds table.

In another aspect, in lieu of a physical even betting card, relevant information may be provided in a temporarily visible display format, for example, on a display of a computer workstation, portable computer, portable tablet device, portable smartphone device and the like.

In yet another aspect, the number of points chosen to shade the line of each selected team may be selected within a range from a maximum shade as a negative number to a maximum shade as a positive number.

In another aspect, the step of arranging the table of cumulative calculated revised odds may include arranging the revised odds in a plurality of lines, each line representing at least the cumulative incremental calculated revised odds for a single multiple of moves falling within a range from zero and a predefined maximum number of points by which the line of an individual team can be shaded.

In still another aspect, subsequent lines of the arranged table of revised odds may be calculated as a function of the cumulative number of shade points as a continuation of an immediately previous line.

In yet another aspect, the calculated revised odds may follow a linear function with respect to a linear incremental change in the total point shade.

In another aspect, the calculated revised odds may follow a non-linear function with respect to a linear incremental change in the total point shade.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which:

FIG. 4A presents a representative debit portion of a variable odds table, which illustrates the relationship between changes in the odds payout of a winning wager with respect to changes in bettor-selectable incremental shading points in a debit direction; and FIG. 4B presents a representative credit portion of a variable odds table, which illustrates the relationship between changes in the odds payout of a winning wager with respect to changes in bettor-selectable incremental shading points in a credit direction.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific formats, layouts and other physical characteristics, relating to the embodiments disclosed herein are not to be considered as limiting, unless the claims expressly state otherwise.

For simplicity, the term "multi-layered wager" as used herein is intended to encompass any type of wager, such as a sports wager, incorporating a betting structure wherein the outcome of multiple individual events each comprise a part, or component, of a single betting wager, and wherein a losing outcome of any one of the individual arms of the bet, results in a loss of the overall betting wager, such as is the case with regard to conventional parlay and teaser sports wagers.

In stark contrast to current conventional fixed shading schemes, the system and method of the present invention provide bettors with an opportunity to alter the shading point value and shading direction for individual arms of a multi-team wager. The system and method are adaptable for use at a particular betting site (e.g., on location at a sportsbook), as well as remotely through the use of mobile, or portable, electronic devices, such as, for example, smartphones, electronic tablets and the like. Bettors, prior to actually confirming/making a particular bettor-defined wager, are provided with visually-depicted updated odds values, in real time, as user-selected variables, such as teams picked and corresponding debit and/or credit shading values, are altered. The present system and method enable viewing of information, on either stationary or portable mobile user electronic devices, such as smartphones, in any of a myriad of easy-to-view graphical formats/layouts. Optionally, the system and method enable communication of information required for a bettor to complete the sliding parlay-teaser wager in an audible form (e.g., for visually-impaired individuals).

Figure 1:
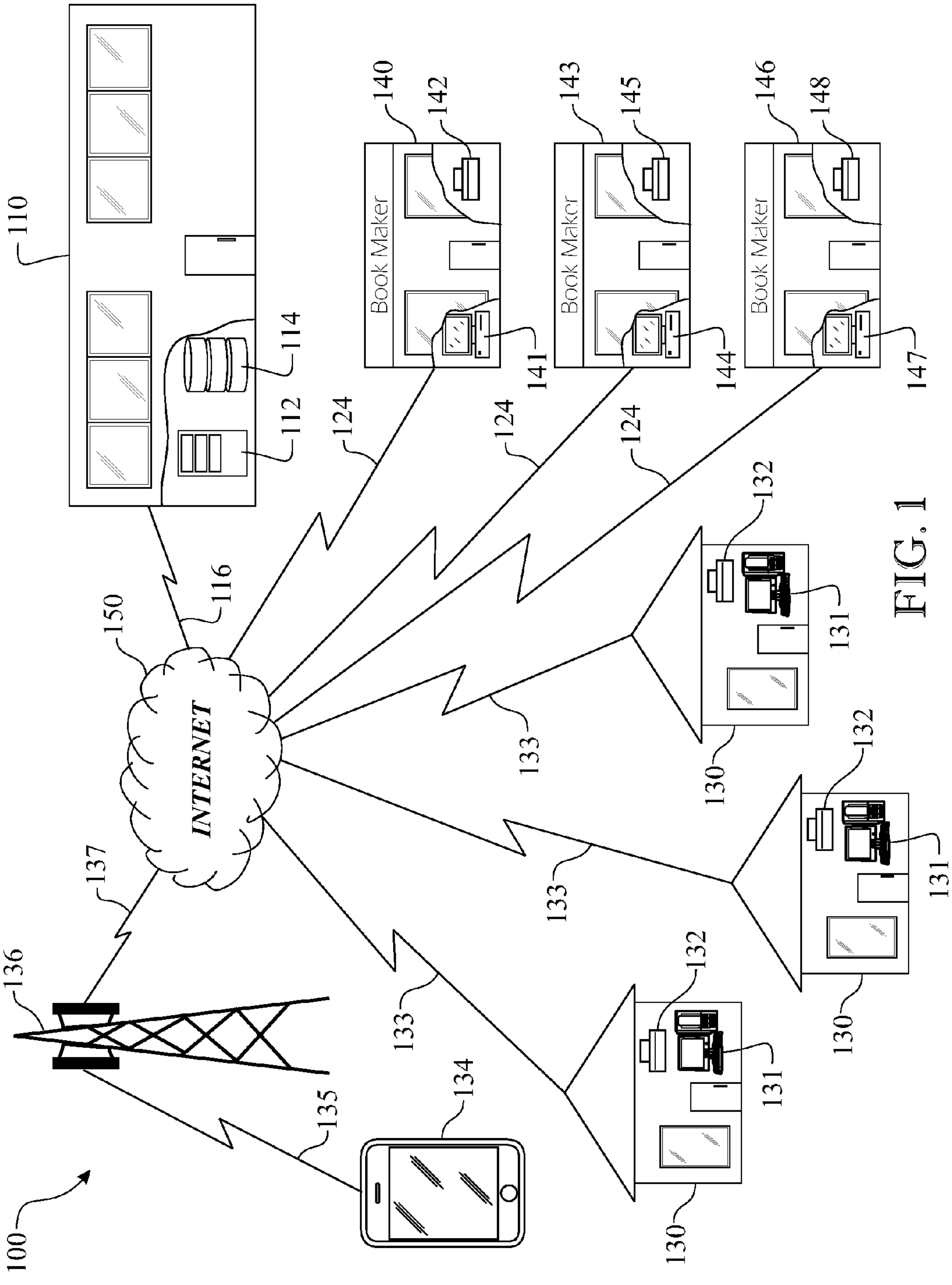
FIG. 1 presents a schematic depiction of an exemplary system for implementing a multi-arm wagering methodology in accordance with the present invention, specifically enabling multi-team parlay-teaser type wagering incorporating a flexible bettor-defined incremental sliding point shading method in the sports (e.g., football and basketball) wagering industry.

Referring initially to FIG. 1, an exemplary multi-layered wager betting system 100 is shown which can be used to enable a bettor to make a sliding parlay-teaser wager in accordance with the present invention. The system, among other things, can generate a physical wagering reference card or sheet or a visible wagering field displayed on a video display of a computer workstation, smart device, and the like, to aid a prospective bettor with regard to, and for actually implementing, a method for placing a multi-layered wager, whereby the bettor can select a customized point "shade" for the multi-layered wager with a bookmaker (such as a sportsbook), as is more clearly described hereinbelow. The wagering system 100 may be based at a central office 110 of a bookmaking company. A bookmaking company central office 110 houses a computer 112 executing an instruction set for calculating intermediate odds for a plurality of combined sporting games from a defined set of sporting games. The computer 112 of the system 100 is further communicatively connected with a searchable storage medium 114 hosting an executable instruction set for computing intermediate odds between a minimum and a maximum as a function of a bettor-selected shade to modify a previously determined, predefined betting line applicable to a selected sports event, for determining whether or not a bettor-selected sports team is deemed to have won the game for purposes of the wager. The computer 112 is also communicatively connected to the Internet 150 with a communications link 116 for communicating with entities outside of central office 110.

One or more bookmakers 140, 143, 146 subscribe to the odds-calculating services offered by the odds-making company 110. The bookmakers 140, 143, 146 are typically associated with a licensed casino. Each bookmaker 140, 143, 146 has a network terminal 141, 144, 147, such as a personal computer, that is further communicatively linked to Internet 150, for example, via electronic communication links 124. In this manner, bookmakers 140, 142, 144 can communicate with central office 110 of the odds-making company utilizing the communication protocols of the Internet and the instruction set executed by computer 112 at central office 110. Further, the network terminals 141, 144, 147 may each have a corresponding respective printer 142, 145, 148 in electronic communication therewith.

In like manner, prospective bettors 130, here represented by house/home pictorials, also possess network terminals 131, such as a personal computer, which are communicative with Internet 150 via electronic communication links 133. The terminals 131 are also electronically communicative with an associated printer 132. Alternatively, prospective bettors 130 can further communicate over Internet 150 utilizing a portable personal electronic device 134 via link 135 of dedicated communications network 136. Communications network 136 is further communicative with Internet 150 via communications link 137. Those practiced in the art will readily recognize that personal electronic device 134 can be any portable electronic device, such as a smart phone, electronic tablet device, personal digital assistant, netbook, or other similar device currently available or available in the future, which exhibits audio-visual electronic communications capabilities, such as text messaging, email, or other communication protocols.

Figure 2A:
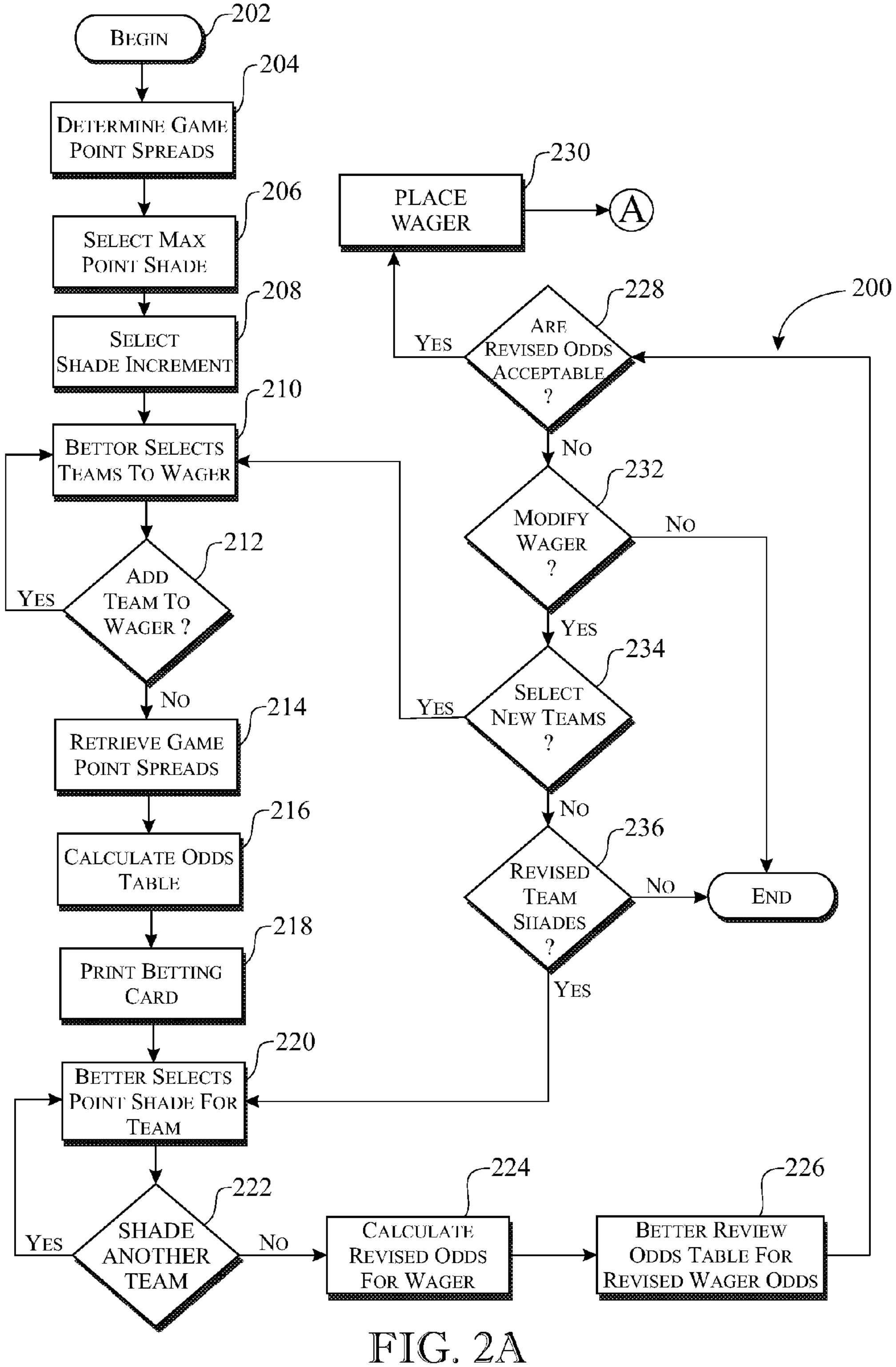
FIGS. 2A and 2B present a flow chart diagram of an exemplary method for making a sliding parlay-teaser wager and determining an outcome of such a wager, in accordance with the present invention.
Figure 2B:
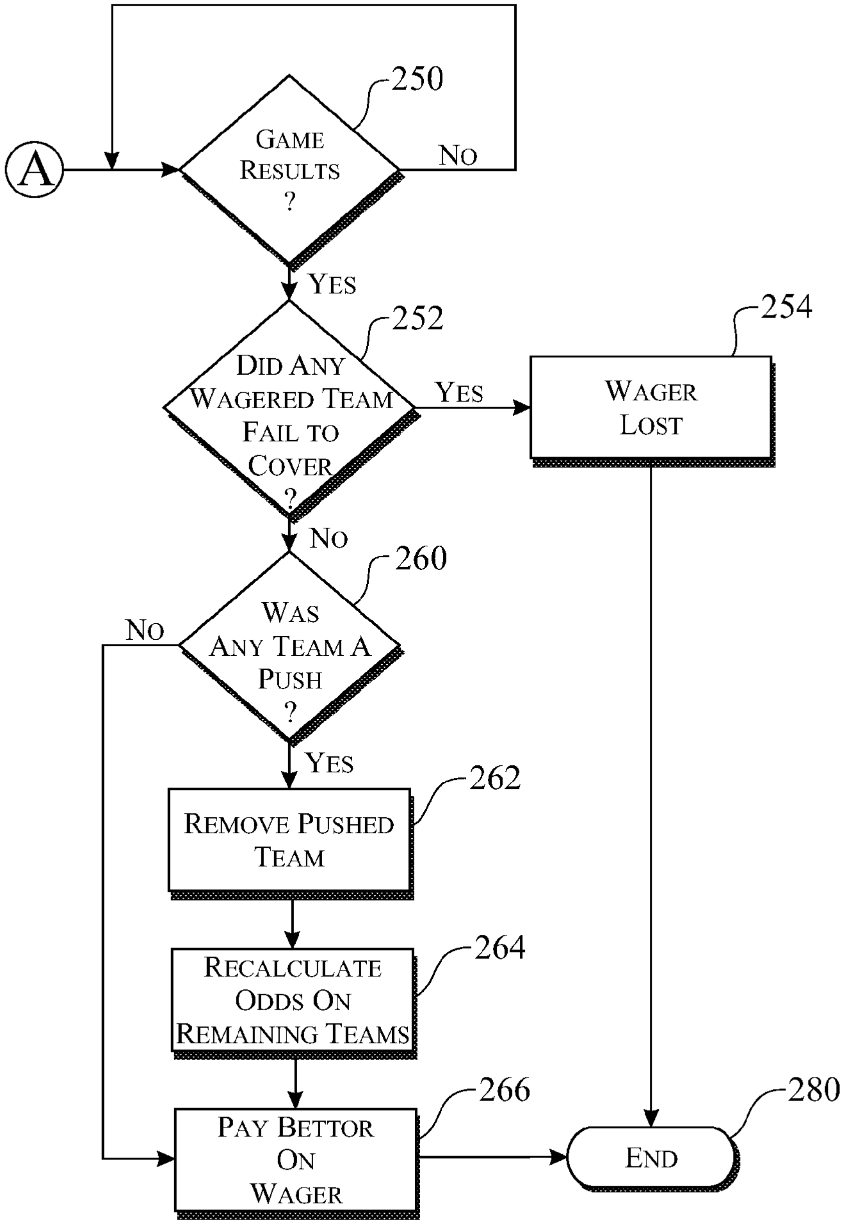

In this manner, prospective bettors 130 can utilize their personal network terminals 131 and printers 132, or alternatively visit a book maker 140, 143, 146 utilizing network terminals 141, 144, 147 and printers 142, 145, and 148, to place a multi-layered wager according to the process 200 illustrated in block diagram form in FIGS. 2A and 2B. The process 200 begins in block 202, and in block 204 the gaming industry determines individual point spreads for the various future sporting events. A particular bookmaker 140, 143, 146 can utilize the point spreads developed by others or develop its own point spreads for sports events for its use. For the purpose of this application, the term "point spread" is used to reference a numerical quantity, typically points, by which one of two teams competing in an event is favored, or expected to win. Alternatively, the point spread is the numerical quantity, or points, which the corresponding non-favored team is expected to lose by. For example, where Team A is playing at Team B, and the home team (Team B) is favored to win by five (5) points, the point spread would be five points and typically denoted "Team A (+5) vs. Team B." That is, bettors betting on Team A (the underdog) to win are allowed to add 5 points to Team A's point total at the end of the game, in order to determine whether Team A won for the purpose of a wager on that game. Referring briefly to the exemplary parlay-teaser card layout (generally denoted by reference numeral 300) depicted in FIG. 3, applicable to a 5-team parlay wager, the bettor has picked the following teams: the Vikings in Game 1 (generally denoted by 302), the Broncos in Game 2 (generally denoted by 304), the Cardinals in Game 3 (generally denoted by 306), the Browns in Game 4 (generally denoted by 308) and the Chargers in Game 5 (generally denoted by 310). Each game (302, 304, 306, 308 and 310) has displayed, directly following the bettor-chosen team, respective betting lines (303, 305, 307, 309 and 311). So, in Game 1 (302) the betting line is denoted as "Vikings (+3)." Therefore, without any shading applied, three points are added to the Vikings score at the end of the game, in accordance with the standard predetermined betting line, for the purpose of bettor wagers on the Vikings in Game 1. This infers that the Vikings are, at the corresponding moment in time, a three-point underdog, the Broncos are a seven-point favorite, and so on.

Referring back to FIGS. 2A and 2B, in block 206 the bookmaker 140, 143, 146 may select, or define, a maximum point shade value permitted for application to any single game selected for inclusion in the wager. The term "point shade" or "shade" is well understood in the sports wagering industry, and is generally defined as the quantity, or number, of points (typically, provided in 0.5-point or 1-point increments) combined with an existing previously-defined point spread as applied to one of the competing teams in a sports game for the purpose of either increasing the odds or for decreasing the odds of a team being declared the winner, with regard to determining whether a wager made by a bettor on the sports game has been won. For example, for football games the maximum shade is typically 6, 6.5 or 7 points, and for basketball games the maximum shade is typically 4, 4.5 or 5 points. In accordance standard known wagering convention, for a standard teaser wager the predetermined, fixed-value, maximum shade is either added to, or subtracted from, the point spread for each and every selected team comprising the overall wager. Significantly, in the current process 200 the bettor 130 can select a customized shade to be applied to each team in the wager. The customized shade can be any quantity of points, ranging from zero to a predetermined maximum shade, in increments established by the bookmaker 140, 143, 146. In block 208 the bookmaker 140, 143, 146 selects the shade increment a prospective bettor 130 is permitted to use. Typically, the shade increment is either 0.5 or 1 point. Utilization of 0.5 point increments minimizes the number of games in which application of the point spread would result in a tie and therefore be a "push" for purposes of the wager.

The prospective bettor 130, in block 210, utilizes the personal network terminal 131, or alternatively the network terminal 142, 145, 146 at a bookmaker 140, 143, 146 to select a team that the bettor 130 desires to include in a particular wager. In block 212 the bettor 130 determines whether to add an additional team to the parlay-teaser wager. Since the wager requires at least the inclusion of two teams for the overall wager, the initial answer to the query is "Yes" and the bettor 130 is returned to block 210 for the selection of at least a second team to include in the wager. After selection of the second team the bettor 130 is again queried in block 212 whether the bettor 130 wishes to add an additional team to the wager. This cycle is repeated until the bettor 130 has selected all teams desired for inclusion in the wager at which time the process 200 proceeds to block 214.

In block 214, the system 100 retrieves the respective point spreads for the individual games, which are then associated with, or applied to, the games selected by the bettor 130 for inclusion in the wager, and displays for the bettor 130 a list of the selected teams as well as the number of points to be applied to that team's final score for determining whether the team selected by the bettor 130 has covered the spread. Referring again briefly to FIG. 3, for example, if the bettor 130 has selected as part of the wager the game of the Vikings vs. Packers, wherein the Packers are a three-point favorite, and the bettor 130 chooses to bet on the Vikings, the team may be listed as "Vikings (+3)," as depicted on card 300. Conversely, had the bettor chosen to bet on the Packers in Game 1, the team would have, instead, been listed/displayed as "Packers (−3)."

Once the bettor 130 has selected the teams that the bettor 130 wishes to include in the wager, the system 100 calculates an odds table, such as the exemplary odds table 400*a*, 400*b* depicted in FIGS. 4A and 4B, and may optionally print a betting card 300 (FIG. 3) utilizing a printer 132 interconnected with the network terminal 131 of the bettor 130 or a printer 142, 145, 148 interconnected with network terminals 141, 144, 147 at book makers 140, 143, 146. As will be apparent to those skilled in the art, in addition to, or in lieu of printing a card, reference numeral 300 may represent a table visibly displayed on a display screen of a computer or any electronic device, stationary or mobile, having a visual display.

Figure 3:
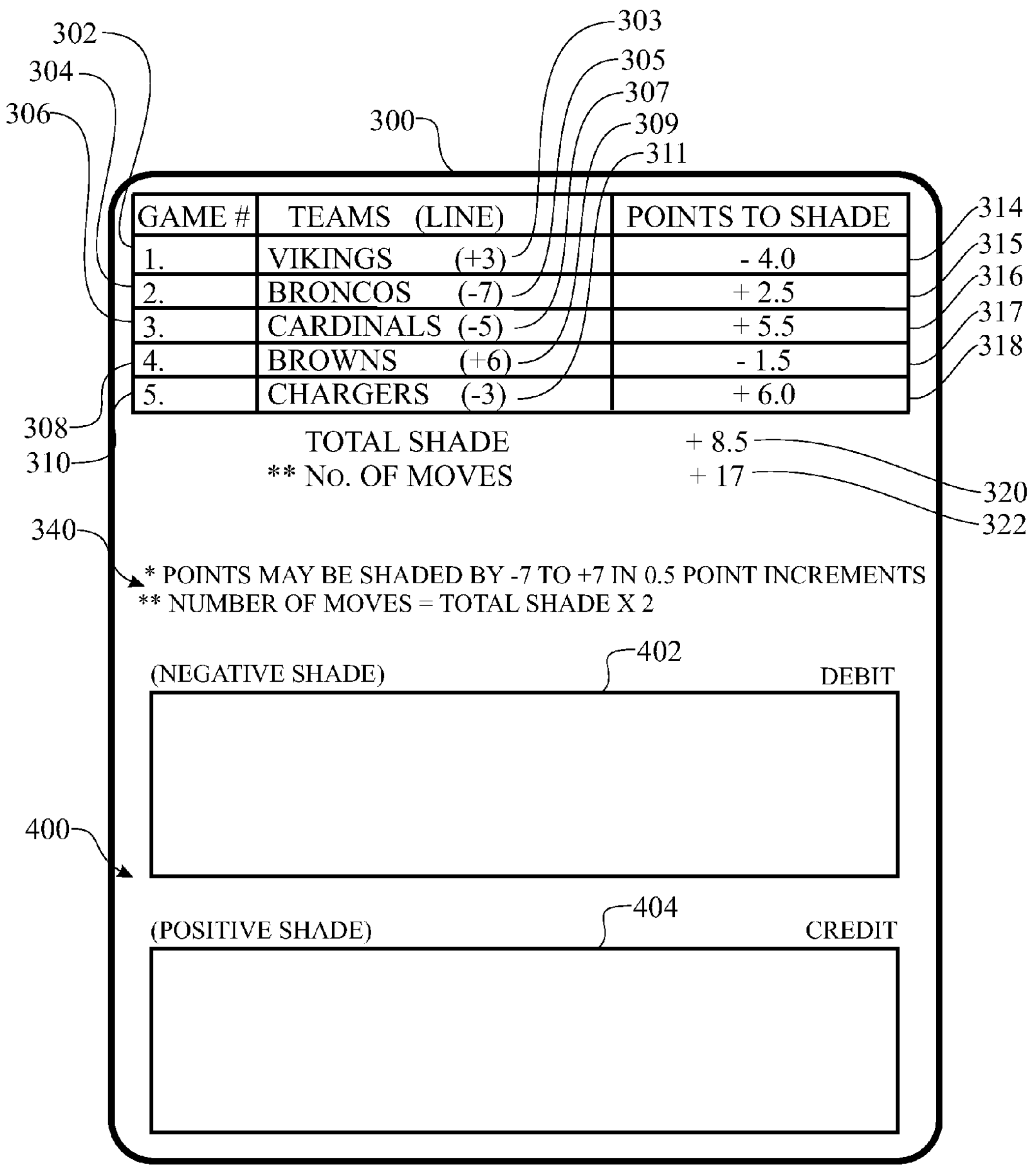
FIG. 3 presents a representative visual depiction of a sliding parlay-teaser betting card layout/format in accordance with the present invention.

Again for the purpose of simplicity, reference numeral 300 is denoted herein as a physical betting card. However, for the purpose of this invention, reference numeral 300 is intended to alternatively represent any visual depiction of a displayed betting table or layout, such as on a display of any computer or electronic device incorporating a display. The sample betting card 300 illustrated in FIG. 3, illustrates an exemplary scenario wherein the bettor 130 has elected to make a five-team wager, generally denoted by reference numeral 401 in FIGS. 4A and 4B, wherein, as will be further clarified hereinbelow, the horizontal row incorporating the numeral "1" represents potential variable shading with respect to Game 1 of the exemplary five-game sliding parlay-teaser wager. As will be apparent to those skilled in the sports wagering industry, the format or layout of the betting card 300 depicted herein can vary without departing from the scope of the invention. While the betting card 300 can be formatted in any one of a variety of configurations, the betting card 300 will at a minimum include each team selection 302, 304, 306, 308, 310 for the wager, and the respective established offered "betting lines" 303, 305, 307, 309, 311 for each team. The terms "betting line" and "line," used interchangeably herein, are intended to refer to the point spread established for a particular sports game, and as applied to one of the teams competing in the sports game or event.

For example, in a contest of Team A vs. Team B wherein the point spread is determined to be five (5) points, if Team A is favored to win the contest then the "line" for Team A will be (−5 points) and the "line" for Team B will be (+5 points), typically represented as "Team A (−5) at Team B." The "line" functions as a handicap for purposes of a wager to equalize the two teams. The betting card 300 may also include one or more items of instruction or definitions, generally denoted herein by reference numeral 340, to aid the bettor 130 with correctly completing a desired wager. It is significant to understand that in the broadest context, this invention provides a computer-implemented system and method enabling bookmakers to offer and process multi-layer wagering, such as sports event teaser and parlay wagers, which provide multi-layer wagering bettors increased flexibility when it comes to applying point shading to individual games that, together, comprise the overall wager. In lieu of conventional betting methods and underlying support software that require predetermined fixed point shading values to each event/game comprising the multi-layered wager, the present system and method enable and facilitate bettor-defined application of shading points to any of the plurality of individual contests.

Referring back to FIG. 3, the instructions 340 can include any information to be considered by the bettor, such as, a maximum range, or quantity of points, each team may be "shaded" (e.g., −7 points to +7 points) and a shade point increment (e.g., 0.5 points) by which the bettor 130 may adjust each team's shade. Finally, the betting card 300 preferably includes, or is otherwise associated with, an odds table 400, which can be displayed in any of a variety of forms and layouts. It should be noted that although the betting card 300 references inclusion of a debit table portion 402 having a layout in accordance with FIG. 4A, it will be apparent to those skilled in the art that this information could be left off of the betting card 300 altogether, or displayed in a different format.

Referring primarily to FIGS. 4A and 4B, for simplicity, the odds table 400 is shown including two table portions: (1) a Debit (negative shade) table portion, shown generally as reference numeral 410, wherein moving in increasingly negative linear increments, e.g., from right-to-left, along a particular individual game line (e.g., Game lines 1 through 5 in the present example), results in increasing odds values (with respect to a favorable wager outcome), corresponding to a reduced likelihood/chance of winning, and correspondingly increasing/improved payouts for a winning wager; and (2) a Credit (positive shade) table portion, shown generally as reference numeral 440, wherein moving in increasingly positive linear increments, e.g., from left-to-right along a particular game line (e.g., Game lines 1 through 5 in the present example), results in decreasing odds values (with respect to a favorable wager outcome), corresponding to an increased likelihood/chance of winning, and correspondingly decreasing/reduced payouts for a winning wager.

The exemplary odds table 400 and its component parts are discussed in greater detail below. As will be apparent to those skilled in the sports wagering industry, the layout of the odds table 400 is exemplary and merely shown in the particular configuration for convenience. Further, a primary purpose of the odds table 400 is to function as a means for determining winning wager odds, specifically in connection with the sliding parlay-teaser wagers of the present invention. Accordingly, a version/format of the odds table 400 may be created for the sole purpose or function of residing on, for example, central office computer 112, storage medium 114, and/or one or more network terminals 141, 144, 147 such that the table is accessible to interact with, and be used as a reference to accomplish/implement, a method in accordance with the present invention.

Odds table 400 could take on any of a variety of visual formats/layouts without departing from the scope of the invention. Similarly, the odds table 400 can be displayed on a permanent-type physical medium such as paper, displayed on a temporary-type medium such as a visual display of an electronic device, stored within a data storage component of a computer, or any other manner available now or in the future, adequate to: (1) communicate information relevant to the bettor, for the purpose of determining the effect a change in one variable (e.g., a 2-point credit shade of a particular team, the addition of new team to the wager, etc.) will have on a resulting winning wager odds/payoff; and (2) determine the outcome of a particular wager. For that matter, it is contemplated that the system and method of the present invention could be employed in a tactile-type format, such as a braille form of a physical medium, or a non-visual audible format.

Since a parlay wager is one in which the bettor 130 is wagering that each individual team, comprising one of a plurality of selected teams, will cover the corresponding point spread, by definition the odds of a winning wager vary, at least in part, in accordance with the total quantity, or number, of teams selected for inclusion in the multi-game, or multi-event, wager. Typically, for example, a four-team parlay wager will carry approximately 12:1 odds, a five-team parlay wager will carry approximately 25:1 odds, and a six-team wager will carry approximately 50:1 odds. The odds of a bettor winning a multi-team (i.e., multi-game) wager are proportional to the number of teams (i.e., games/events) included in a single multi-team wager. Obviously, the more teams that are included in such a wager, the higher (or worse) the odds will be of the bettor winning the underlying wager, and the greater (or better) the corresponding payout will be if the bettor wins the wager. Likewise, the fewer teams included in such a wager, the lower (or worse) the odds will be of the bettor winning the underlying wager, and the lower (or worse) the corresponding payout will be if the bettor wins the wager.

The exact odds for a non-shaded parlay wager are subject to calculation by the individual bookmaker 140, 143, 146 and may vary slightly between bookmakers. However, for the purpose of clarifying the present system and method, in the selected example, the baseline odds 402 for the five-team wager illustrated in FIGS. 4A and 4B are assumed to be set at 25:1 (or 25-to-1). This means that the payout for winning the exemplary five-game wager, without shading the predetermined betting lines for the individual games (Games 1 through 5), would be $25 per each $1 waged by the bettor.

A significant purpose, or function, of the present multi-layer parlay-teaser wager is to permit the bettor 130 to implement customized fixed-increment shading for each selected team, with the resulting customized winning wager odds/payout immediately communicated to the bettor 130. For the purpose of discussion, we will continue using the example, wherein this can be accomplished via the exemplary odds table format/layout shown generally as reference numeral 400 (FIGS. 4A and 4B), which, again, although not absolutely necessary, is preferably represented in a visual format. Again, it cannot be overstressed that although the odds table 400 is depicted in a particular format for the purposes of discussion, it will be abundantly clear that it is not necessary that an odds table, such as that depicted in FIGS. 4A and 4B, be displayed or otherwise communicated to a bettor. What is important is that that particular information is communicated to the bettor, which is necessary to enable and facilitate the bettor to accomplish a bettor-customizable sliding multi-layered bet in accordance with the present invention. Just a few examples of the type of pertinent information that should be communicated (e.g., displayed on a bettor device) viewable, and in some cases modifiable and selectable, include: (1) the pool of teams available for selection for inclusion in the wager; (2) a non-shaded beginning point spread for each available team (i.e., the baseline odds); (3) an available range of point shade values, including a predefined point shade increment value; (4) an initial winning wager odds value (i.e., starting line without shading applied); and (5) a revised/resulting winning wager odds value (incorporating any user-selected shading values). Depending upon the dimensions of a particular display, such pertinent information may be provided using any means now known or not yet developed. As an example, an application for employing the method of the present invention via a smartphone could incorporate variable input fields having a scrolling feature to enable a user to scroll through available choices (e.g., for the above exemplary pertinent information) and subsequently select/input a particular chosen value for a particular variable.

Continuing with our exemplary odds table, again provided for discussion purposes only, the baseline odds 402 (i.e., no shade applied to any team) may be displayed, for example, at the top of the odds table 400, and/or at the top of the individual debit and credit table portions, 410 and 440, respectively, depending upon the particular layout. The odds tables Debit and Credit portions, 410 and 440, respectively, may include respective Points header lines, 412 and 442, and corresponding incremental Moves header lines, 414 and 444. The Points header lines 412, 442 illustrate, in accordance with a predetermined incremental value (in this case 0.5 points), the numbered range of shade points (such as, for example, −3.5 points indicated as reference numeral 420 of FIG. 4A, and +3 points indicated as reference numeral 450 of FIG. 4B).

The Moves header line 414, 444 illustrates the corresponding number of incremental (in this case, +/−0.5 point increments) moves directly corresponding with the exemplary chosen selected shade points for a given team. So, continuing with this example, the −3.5 "debit" shade points 420 corresponds to seven (7) "debit" moves made (represented by reference numeral 422), and the +3 "credit" shade points 450 corresponds to six (6) "credit" moves (represented by reference numeral 452).

Again, the debit shade points 420 carry a negative value, and the credit shade points 450 carry a positive value. The bookmaker 140, 143, 146 calculates, or otherwise establishes, a maximum odds (46:1 in this example), represented by reference numeral 430, which would result from applying a maximum negative shade (i.e. −7 points, corresponding to −14 incremental moves, for each of the five teams comprising the 5-game wager). Similarly, the bookmaker 140, 143, 146 calculates, or otherwise establishes, a minimum odds (4:1 in the example), represented by reference numeral 460, which would result from applying a maximum positive shade (i.e. +7 points, corresponding to +14 incremental moves, for each of the five teams together comprising the 5-game wager). Again, the formats and numerical values are merely exemplary for facilitating an understanding of the present invention. It will be apparent to those skilled in the art that, for example, the number of individual events comprising the wager, the betting line shade increments, the maximum and minimum shade points/moves, the format/layout of information, and the means by which information is imparted or made available to a prospective bettor are in no way intended to be limited by the exemplary information displayed in the accompanying figures or employed in the specification.

There are a number of mathematically relatable variables, enabling calculation of certain "unknown" values based upon "known" or "given" information/data. For instance, given the baseline odds 402, the maximum odds 430, the minimum odds 460, and the total number of incremental moves possible (i.e., the number of teams selected multiplied by the maximum number of moves per team), it is possible to automatically calculate the incremental odds value 404. This can be a linear function as illustrated in the tables 410, 440 of FIGS. 4A and 4B. For instance, the minimum odds 460 (4:1) can be subtracted from the maximum odds 430 (46:1), and the resulting value then divided by the total number of possible moves per team (i.e., 28 possible moves, or 14 moves in the (−) debit direction and 14 moves in the (+) credit direction), the resulting value can then be multiplied by the number of teams (e.g., 5) included in the wager. So, in this particular example: (46−4="42"), which, in turn, can be divided by "140" (i.e. 28 possible incremental moves per team multiplied by 5 teams). This yields a fixed incremental change in odds, or odds increment 404, of 0.3 per incremental move. In other words, for each 0.5-point shaded in the debit odds table 410, the baseline odds 402 (i.e., 25:1 or 25-to-1) are increased by "0.3." Thus, a debit direction shade of "−3.5 points" (indicated by reference numeral 420) represents "−7" incremental moves (indicated by reference numeral 422), which, multiplied by the fixed incremental debit change in odds, or "−0.3" per move in the debit direction, yields a total odds increase of "2.1." This, added to the baseline odds 402 (i.e., 25-to-1), yields an increased overall wager odds of 27.1-to-1. Similarly, a shade of +3 points (indicated by reference numeral 450) represents 6 credit direction moves (indicated by reference numeral 452), which, multiplied by the fixed incremental credit change in odds, or "+0.3" per move in the credit direction, yields a total odds decrease of "1.8" This, subtracted from the baseline odds 402 (i.e., 25-to-1), yields a decreased overall wager odds of 23.2-to-1. Those practiced in the art will readily recognize that while the above example represents a linear function; the incremental odds for each move can also be calculated as a non-linear function and such non-linear increments are contemplated to be within the scope of the invention. The calculations provided herein with regard to determining odds values displayed in individual cells of the exemplary table are well known and not a necessary component of the invention. Instead, they are merely provided to clearly illustrate one method for automatically creating, or altering, an output display table as an optional step of a method of the present invention.

In block 220, the bettor selects a team associated with Game 1 302, evaluates the corresponding displayed "line" 303 for that team, and (optionally) sets a bettor-defined preferred number of shade points 314 by which the bettor 130 wishes to modify the base line 303. In this example, in Game 1, the chosen team (i.e., Vikings) have an established line of +3, preferably displayed as "Vikings (+3)," which the bettor 130 wishes to modify to a new line, i.e., "Vikings (−1)," by applying a shade 314 of −4.0 points. Once the bettor 130 has selected a point shade for a team, the bettor 130 is queried in block 222 if he wishes to shade another team. If the answer to the query is "Yes," the bettor is returned to block 222 to, at the bettors options, select a point shade 315 (in this example +2.5) to be applied to a subsequently-listed bettor selection (i.e., Broncos (−7)), and then to continue to sequentially, if desired, define point shades (e.g., +5.5) 316, (e.g., −1.5) 317 and (+6.0) 318, to be applied to the corresponding bettor-selected teams (i.e., Cardinals (−5), Browns (+6) and Chargers (−3).

In the example represented by betting card 300 in FIG. 3, the bettor 130 has selected five teams 302, 304, 306, 308, 310 for the parlay-teaser wager, wherein each team has an associated starting line 303, 305, 307, 309, 311. Once the bettor 130 has selected corresponding point shades 314 for all desired teams 302, 304, 306, 308, 310 and no longer wishes to shade another team, the process 200 progresses to block 224 where the odds of the wager are calculated.

As shown in the example of FIG. 3, the bettor 130 has selected respective point shades of −4.0, +2.5, +5.5, −1.5, and +6.0. The total point shade for the wager is derived by calculating the sum of the individual point shade values (i.e., (−4.0)+(+2.5)+(5.5)+(−1.5)+(+6.0)), resulting in total point shade value of (+8.5), shown as reference 320. Alternatively, the total shade for the wager could be derived by simply calculating the total number of incremental moves (in this case 17), shown as reference 322, and multiplying the total incremental move, by the predefined point increment (in this case predefined as 0.5), or (i.e., (17*0.5)=8.5). In this example, the total point shade for the five teams is +8.5 points, with a corresponding total Moves shade of +17 moves on the credit table 440 (FIG. 4B). So, the newly-revised wager odds is simply determined by beginning at the pre-shading 25-to-1 baseline odds box (402) on Line 1 (FIG. 4*b*), and then making a series of seventeen (17) consecutive moves to the right. More specifically, after reaching the end of Line 1 (only 14 incremental moves), 3 additional incremental moves are made, the first of which is to the first, or leftmost, odds cell on Line 2 of the Credit portion 440 of the table 400, progressing to the third cell of Line 2 (denoted by reference numeral 456), to derive a new post-shading wager odds value of 19.9/1.

Again, in lieu of calculating the revised odds, it is possible, where relevant data is provided in the form of a two-dimensional table of cells, revised odds 456 can be discovered by counting the number of cell-to-cell moves, starting at the top line, counting across and progressing down line by line until the correct number of moves have been made. This could be done manually, for example, by a bettor 130 having access to a physically displayed table of the format used herein. Likewise, this could be done automatically utilizing very simple software code analyzing the data as a two-dimensional array. As will be apparent to those skilled in the art, where the present invention is implemented for use on a computer or any other electronic device, the method includes automatically making the relevant calculations, or calculating the relevant incremental moves, to instantly locate the cell, or location, and, optionally, displaying the updated recalculated wager odds. Furthermore, the respective box or cell may be highlighted or otherwise temporarily distinguished from all of the other cells depicted in the table. The bettor 130 can then review the revised odds 456 for the wager in block 226. Again, as will be apparent to those skilled in the art, while the calculations are described in detail herein, during actual implementation using a computer or other electronic device having a display, all calculations are completed automatically in real time and simply displayed to the bettor, as alternative betting combinations are considered. This is a significant function of the method of the present invention.

Once the bettor 130 has reviewed the revised odds 456 in block 226, the bettor is queried, in block 228, whether the revised odds 456 are acceptable. If the bettor 130 is satisfied with the revised odds 456, the bettor is prompted to place the wager in block 230 and the process 200 progresses to bubble A for continuation in FIG. 2B. If, however, the bettor 130 determines that the revised odds 456 are not acceptable the bettor 130 is queried in block 232 whether the bettor 130 wishes to modify the wager. If the bettor does not wish to modify the wager, the process 200 ends at block 280 without a wager being made. If, however, the bettor 130 elects to modify the wager, the process 200 progresses to block 234 where the bettor 130 is queried whether to select new teams for the wager. If the bettor wishes to select new teams the process 200 returns to block 210 to repeat the selection process in the subsequent blocks. However, if the bettor 130 does not wish to select new teams, he is queried in block 236 whether he wishes to revise the individual point shades for the selected teams. If the bettor 130 wishes to revise the point shades the process 200 returns to block 220 to repeat the point shading process in the subsequent blocks thereafter. If the bettor 130 does not wish to revise the individual point shades in block 236 the process 200 then ends at block 280 without a wager being made.

Referring now to FIG. 2B, the process 200 continues from FIG. 2A at bubble A. Once the wager has been placed in block 230, the process 200 continues to query in block 250 whether game results are available. If not, the process 200 loops back and continues to query in block 250. Once the game results are available, the process 200 then queries in block 252 whether any of the teams on which the bettor 130 wagered failed to cover the point spreads shaded by the bettor 130. If any of the teams failed to cover, the process 200 is directed to block 254 indicating that the wager by the bettor 130 is lost, and the process 200 then ends at block 280.

If, however, there were no teams that failed to cover the as-shaded point spreads made by the bettor 130, optionally, depending upon the particular "push" rules employed, the process 200 may proceed to block 260 to determine whether any of the teams as shaded were a "push" in their respective game. If no game was a determined to be a push, the process 200 may advance to block 266, where the bettor 130 may be paid on his wager according to the odds calculated in block 224. If one or more games was a "push" as determined by the shaded points selected by the bettor 130, then each game which was a "push" may, for example, be removed from the wager, and in block 264 the wagering odds recalculated as in block 224 based upon the number of remaining teams. Accordingly, in block 266 the bettor 130 is paid on the wager for the remaining teams. The process 200 then ends at block 280.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

The significance of this unique feature of the present method facilitating the placement of combination parlay-teaser, PARTEASER™, wagers enabling the bettor to selectively shade individual games without being forced to incorporate a fixed teaser value to each individual game of parlay cannot be overemphasized. The integration of a bettor-specified point shading slide feature provides a marked improvement in the flexibility and control an individual bettor is afforded vis-à-vis multi-layered sports related wagering. Furthermore, the system and methods provide a simple, yet effective, mechanism lending itself, at one level, to the efficient creation of both physical parlay-teaser betting cards and graphically-displayable version of the same, which, at another level, provide prospective bettors with a flexible means for altering parlay and tease related variables, such as the number of teams, and variable user-selectable credit and debit shading value, immediately communicating resulting wager odds variations.

What is claimed is:

1. A computer-implemented method for providing increased wagering flexibility to an individual bettor in the process of making a multiple armed event wager from an electronic wager input device having a display, the method comprising steps of:

providing and accessing a wagering system of the type including a central computer system accessible by at least one network terminal in bi-directional electronic communication therewith via an electronic network and having a bettor viewable display, the central computer hosting an executable instruction set for computing intermediate odds between a minimum odds value and a maximum odds value as a function of bettor-controlled modification and redistribution of equal starting shade values associated with respective individual arms of said multiple armed event wager used to determine whether the bettor has won a respective individual arm of said multiple armed wager;

selecting a plurality of teams by said bettor via said display, each selected team associated with an individual one of said events, to thereby establish a multiple team combined wager;

determining baseline odds for said multiple armed wager, said baseline odds based upon application of said equal starting shade values to each of the selected plurality of teams competing in the respective events;

defining a maximum point value by which the line of an individual team can be shaded;

defining a point increment value by which the shaded points can be adjusted;

calculating a minimum odds value of all teams winning, for purposes of the wager, when a maximum positive shade is applied to the initial line of every team included in the wager;

calculating the maximum odds of all teams winning, for purposes of the wager, when a maximum negative shade is applied to the initial line of every team included in the wager;

choosing, by said bettor via said display, a quantity of points to shade the initial lines of each of said respective selected teams and choosing a positive or negative shading direction in which to apply said chosen quantity of points to each said starting line, wherein said step of choosing results in a bettor-defined redistribution of said chosen quantity of points;

combining the chosen quantity of points shaded for each team to obtain a total point shade value;

calculating, as a function of the total point shade value, respective revised odds for the wager, the revised odds for the wager being intermediate of the respective calculated minimum and calculated maximum odds values; and placing the wager at the calculated revised odds.

2. The method according to claim 1 wherein the maximum quantity of points by which the line of an individual team can be shaded falls within a range of zero points and seven points.

3. The method according to claim 1 wherein the point increment by which the shaded points can be adjusted is selected from the group consisting of: one-half point and one point.

4. The method according to claim 1 wherein the quantity of points chosen to shade the line of each selected team is chosen within a range between the maximum shade as a negative number to the maximum shade as a positive number.

5. The method according to claim 1 wherein the step of combining the chosen quantity of points shaded for each team is performed by totaling the quantity of points shaded for each team and further wherein the shade for each team is positive-negative sensitive.

6. The method according to claim 5 wherein the step of calculating the revised odds for the wager includes revising the baseline odds by a calculated odds increment for each point increment comprising the combined shaded point total.

7. The method according to claim 6 wherein the odds increment per point increment is calculated by subtracting the maximum odds from the base line odds when the combined shaded point total is a negative value and dividing the difference by the total number of possible point increments between zero and the maximum number of total points possible to shade all teams in the wager, and further wherein the odds increment per point increment is calculated by subtracting the minimum odds from the base line odds when the combined shaded point total is a positive value and dividing the difference by the total number of possible point increments between zero and the maximum number of total points possible to shade all teams in the wager.

8. The method according to claim 7 wherein the revised odds for the wager are calculated by:

dividing the total point shade by the defined point increment to determine the number of moves;

multiplying the number of moves by the odds increment to yield a change in odds from the base line odds; and adding the change in odds to the base line odds when the total shade points are negative and subtracting the change in odds from the base line odds when the total shade points are positive.

9. A method as recited in claim 1, further comprising, after the step of calculating revised odds for said wager, the steps of:

arranging the cumulative calculated revised odds for each incremental point change in table form, each odds table further including the baseline odds, the maximum odds, the minimum odds, and the defined point increment; and displaying the table upon said bettor viewable display, wherein said displayed table is inclusive of at least the plurality of selected teams, the line for each individual team, and the calculated odds table.

10. The method according to claim 9 wherein the maximum number of points by which the line of an individual team can be shaded is between zero points and seven points.

11. The method according to claim 9 wherein the point increment by which the shaded points can be adjusted is selected from the group of one-half point and one point.

12. The method according to claim 9 wherein the number of points chosen to shade the line of each selected team is chosen within a range between the maximum shade as a negative number to the maximum shade as a positive number.

13. The method according to claim 9 wherein the step of arranging the table of cumulative calculated revised odds includes arranging the revised odds in a plurality of lines, each line representing at least the cumulative incremental calculated revised odds for a single multiple of moves between zero and the defined maximum number of points by which the line of an individual team can be shaded.

14. The method according to claim 13 wherein subsequent lines of the arranged table of revised odds are calculated as a function of the cumulative number of shade points as a continuation of a most previous line.

15. The method according to claim 14 wherein the calculated revised odds follow a linear function with respect to a linear incremental change in the total point shade.

16. The method according to claim 15 wherein the odds increment per point increment is calculated by subtracting the maximum odds from the base line odds when the combined shaded point total is a negative value and dividing the difference by the total number of possible point increments between zero and the maximum number of total points possible to shade all teams in the wager, and also wherein the odds increment per point increment is calculated by subtracting the minimum odds from the base line odds when the combined shaded point total is a positive value and dividing the difference by the total number of possible point increments between zero and the maximum number of total points possible to shade all teams in the wager.

17. The method according to claim 16 wherein the revised odds for each shade point increment are calculated by:

incrementing a most previous total point shade by the defined point increment;

dividing the total point shade by the defined point increment to determine the number of moves;

multiplying the number of moves by the odds increment to yield a change in odds from the base line odds; and adding the change in odds to the base line odds when the total shade points are negative and subtracting the change in odds from the base line odds when the total shade points are positive.

18. The method according to claim 14 wherein the calculated revised odds follow a non-linear function with respect to a linear incremental change in the total point shade.

* * * * *